United States Patent
Boyer et al.

(10) Patent No.: US 9,194,550 B2
(45) Date of Patent: Nov. 24, 2015

(54) ROADWAY LUMINAIRE AND METHODS OF USE

(71) Applicant: LSI Industries, Inc., Cincinnati, OH (US)

(72) Inventors: John D. Boyer, Lebanon, OH (US); James G. Vanden Eynden, Hamilton, OH (US)

(73) Assignee: LSI Industries, Inc., Cincinnati, OH (US)

( * ) Notice: Subject to any disclaimer, the term of this patent is extended or adjusted under 35 U.S.C. 154(b) by 250 days.

(21) Appl. No.: 14/038,216

(22) Filed: Sep. 26, 2013

(65) Prior Publication Data

US 2014/0029257 A1 Jan. 30, 2014

Related U.S. Application Data

(63) Continuation of application No. 13/800,955, filed on Mar. 13, 2013, now Pat. No. 8,567,983, which is a continuation of application No. 13/429,863, filed on Mar. 26, 2012, now Pat. No. 8,434,893, which is a (Continued)

(51) Int. Cl.
*F21V 7/00* (2006.01)
*F21S 8/08* (2006.01)
(Continued)

(52) U.S. Cl.
CPC .............. *F21S 8/086* (2013.01); *F21V 7/0083* (2013.01); *F21V 7/04* (2013.01); *F21V 7/18* (2013.01); *F21V 11/02* (2013.01); *F21V 7/22* (2013.01);
(Continued)

(58) Field of Classification Search
CPC .......... F21S 8/086; F21V 7/18; F21V 7/0083; F21V 11/02
USPC .............. 362/153.1, 145, 225, 240, 241, 297, 362/301, 296.04, 431, 109
See application file for complete search history.

(56) References Cited

U.S. PATENT DOCUMENTS 1,235,274 A 7/1917 Wood
1,365,319 A 1/1921 Hazard
(Continued)

FOREIGN PATENT DOCUMENTS

AU 2008200821 4/2009
CN 1698202 11/2002
(Continued)

OTHER PUBLICATIONS

Response dated Oct. 10, 2012 to Office Action dated Mar. 26, 2012 from Corresponding Chinese Application No. 200880010491.0.
(Continued)

*Primary Examiner* — David V Bruce
(74) *Attorney, Agent, or Firm* — McDermott Will & Emery LLP

(57) ABSTRACT

A lighting apparatus having a base member and a directional member are shown and described. The base member includes a first surface having a plurality of reflective elements extending therefrom. The base member also including a plurality of openings arranged in a pattern. Each opening is configured to receive a respective light source. The directional member has a portion of a reflective surface positioned relative to at least one opening to reflect light radiating from a lighting source disposed within the opening towards a portion of at least one of the reflective elements extending from the base member.

37 Claims, 11 Drawing Sheets

Related U.S. Application Data continuation of application No. 13/150,625, filed on Jun. 1, 2011, now Pat. No. 8,177,386, which is a continuation of application No. 12/754,090, filed on Apr. 5, 2010, now Pat. No. 8,002,428, which is a continuation of application No. 12/166,536, filed on Jul. 2, 2008, now Pat. No. 7,828,456.

(60) Provisional application No. 60/980,562, filed on Oct. 17, 2007.

(51) Int. Cl.
*F21V 7/04* (2006.01)
*F21V 11/02* (2006.01)
*F21V 7/18* (2006.01)
*F21W 131/10* (2006.01)
*F21W 131/103* (2006.01)
*F21Y 101/02* (2006.01)
*F21Y 105/00* (2006.01)
*F21V 7/22* (2006.01)
*F21V 13/04* (2006.01)

(52) U.S. Cl.
CPC .............. *F21V 13/04* (2013.01); *F21W 2131/10* (2013.01); *F21W 2131/103* (2013.01); *F21Y 2101/02* (2013.01); *F21Y 2105/001* (2013.01); *Y02B 20/72* (2013.01)

(56) References Cited

U.S. PATENT DOCUMENTS

| | | | |
|---|---|---|---|
| 1,563,102 A | 11/1925 | Obsurn | |
| 2,281,346 A | 4/1942 | Biller | |
| 2,411,952 A | 12/1946 | Biller | |
| 3,033,979 A | 5/1962 | Cahill | |
| 3,544,787 A | 12/1970 | Audeval | |
| 3,701,898 A | 10/1972 | McNamara, Jr. | |
| 4,007,365 A | 2/1977 | Stempfle et al. | |
| 4,161,014 A | 7/1979 | Dey et al. | |
| 4,268,897 A | 5/1981 | Schierwagen et al. | |
| 4,320,442 A | 3/1982 | McCamy | |
| 4,337,507 A | 6/1982 | Lasker | |
| 4,358,816 A | 11/1982 | Soileau | |
| 4,383,289 A | 5/1983 | Lewin | |
| 4,425,603 A | 1/1984 | Courson | |
| 4,432,044 A | 2/1984 | Lautzenheiser | |
| 4,507,717 A | 3/1985 | Wijbenga | |
| 4,536,828 A | 8/1985 | Mori | |
| 4,617,612 A | 10/1986 | Pritchett | |
| 4,641,226 A | 2/1987 | Kratz | |
| 4,694,382 A | 9/1987 | Sales | |
| 4,780,800 A | 10/1988 | Mullins | |
| 4,847,734 A | 7/1989 | Katoh et al. | |
| 5,008,791 A | 4/1991 | Caferro | |
| 5,438,485 A | 8/1995 | Li et al. | |
| 5,440,467 A | 8/1995 | Lautzenheiser | |
| 5,473,522 A | 12/1995 | Kriz et al. | |
| 5,523,930 A | 6/1996 | Fritts | |
| 5,561,346 A | 10/1996 | Byrne | |
| 5,582,480 A | 12/1996 | Zwick et al. | |
| 5,647,152 A | 7/1997 | Miura | |
| 5,660,461 A | 8/1997 | Ignatius et al. | |
| 5,806,972 A | 9/1998 | Kaiser et al. | |
| 5,857,765 A | 1/1999 | Deron | |
| 6,166,860 A | 12/2000 | Medvedev et al. | |
| 6,206,548 B1 | 3/2001 | Lassovsky | |
| 6,386,723 B1 | 5/2002 | Eberlein et al. | |
| 6,431,726 B1 | 8/2002 | Barton | |
| 6,474,848 B1 | 11/2002 | Lahner et al. | |
| 6,705,744 B2 | 3/2004 | Hubbell | |
| 6,818,864 B2 | 11/2004 | Ptak | |
| 6,840,654 B2 | 1/2005 | Guerrieri et al. | |
| 6,893,140 B2 | 5/2005 | Storey et al. | |
| 7,021,806 B2 | 4/2006 | Ovenshire | |
| 7,090,370 B2 | 8/2006 | Clark | |
| 7,275,841 B2 | 10/2007 | Kelly | |
| 7,293,908 B2 | 11/2007 | Beeson et al. | |
| 7,312,560 B2 | 12/2007 | Ouderkirk et al. | |
| 7,597,453 B2 | 10/2009 | Simon | |
| 7,758,212 B2 | 7/2010 | Jan et al. | |
| 7,780,306 B2 | 8/2010 | Hoshi | |
| 7,828,456 B2 | 11/2010 | Boyer et al. | |
| 7,896,514 B2 | 3/2011 | Gomi | |
| 7,938,552 B2 | 5/2011 | Fan et al. | |
| 8,042,968 B2 | 10/2011 | Boyer et al. | |
| 8,215,799 B2 | 7/2012 | Vanden Eynden et al. | |
| 8,356,916 B2 | 1/2013 | Gordin et al. | |
| 8,382,334 B2 | 2/2013 | Vanden Eynden et al. | |
| 8,480,264 B2 | 7/2013 | Vanden Eynden et al. | |
| 2004/0026400 A1 | 2/2004 | Ptak | |
| 2004/0188593 A1 | 9/2004 | Mullins | |
| 2005/0157504 A1 | 7/2005 | Vanden Eynden | |
| 2005/0259082 A1 | 11/2005 | Potsch | |
| 2005/0265035 A1 | 12/2005 | Brass et al. | |
| 2006/0007553 A1 | 1/2006 | Bogner et al. | |
| 2006/0245208 A1 | 11/2006 | Sakamoto et al. | |
| 2007/0002554 A1 | 1/2007 | Lim | |
| 2007/0247851 A1 | 10/2007 | Villard | |
| 2008/0219000 A1 | 9/2008 | Fan | |
| 2008/0278943 A1 | 11/2008 | Van Der Poel | |
| 2009/0021931 A1 | 1/2009 | Mayer et al. | |
| 2009/0103288 A1 | 4/2009 | Boyer et al. | |
| 2010/0135006 A1 | 6/2010 | Huang | |
| 2011/0110080 A1 | 5/2011 | Boyer et al. | |
| 2011/0176307 A1 | 7/2011 | Fan et al. | |
| 2011/0210676 A1* | 9/2011 | Beghelli | 315/185 R |
| 2012/0230029 A1 | 9/2012 | Vanden Eynden et al. | |
| 2013/0120987 A1 | 5/2013 | Vanden Eynden et al. | |
| 2013/0242564 A1 | 9/2013 | Vanden Eynden et al. | |

FOREIGN PATENT DOCUMENTS

| | | |
|---|---|---|
| CN | 1862078 | 11/2006 |
| CN | 101220928 | 7/2008 |
| DE | 7540059 | 5/1976 |
| DE | 10300990 | 7/2003 |
| EP | 0560327 | 9/2003 |
| EP | 1496488 | 1/2005 |
| EP | 1496488 A1 | 1/2005 |
| EP | 1586814 A2 | 10/2005 |
| EP | 1818607 | 8/2007 |
| EP | 2019250 | 1/2009 |
| ES | 2195783 | 12/2003 |
| GB | 1126868 | 9/1968 |
| JP | S58-164104 | 9/1983 |
| JP | HEI 01-137503 | 5/1989 |
| JP | H07-220517 | 8/1995 |
| JP | 11-175011 | 7/1999 |
| JP | 2004-6317 | 1/2004 |
| JP | 3694310 | 7/2005 |
| JP | 2006520518 | 9/2006 |
| JP | 2006332024 | 12/2006 |
| JP | 2007-066658 | 3/2007 |
| JP | 48-22692 | 11/2011 |
| WO | WO9622490 | 7/1996 |
| WO | 2004053817 | 6/2004 |
| WO | 2004068182 | 8/2004 |
| WO | WO2005066537 | 7/2005 |
| WO | WO2005066539 | 7/2005 |
| WO | 2007037035 | 4/2007 |
| WO | WO2007-088665 | 8/2007 |
| WO | 2007/104136 | 9/2007 |
| WO | WO2007/117608 | 10/2007 |
| WO | WO2008/140884 | 11/2008 |
| WO | WO2009/052094 A1 | 4/2009 |
| WO | WO2009/094819 A1 | 8/2009 |

OTHER PUBLICATIONS

Office Action dated Jan. 4, 2013 from Corresponding Chiense Patent Application No. 201010180410.0.

(56) References Cited

OTHER PUBLICATIONS

Office Action dated Apr. 8, 2013 from Corresponding Chinese Patent Application No. 2010-530063.
English Version of Response dated Jul. 19, 2013 to Office Action dated Feb. 21, 2013 from Corresponding Japanese Patent Application No. 2010-530063.
Office Action dated Jun. 20, 2014 from Corresponding Chinese Patent Application No. 201310469664.8.
A Complete System—Roadway Fix tuna. Mast Arm & Tenon Pole or Just the Fixture, Ordering Your Crossover Roadway Lighting from LSI is as Easy as 1, 2, 3 (2009).
Australian Examination Report dated Feb. 8, 2011 from Corresponding Australian Application No. 2008312668.
Examination Report dated Dec. 8, 2011 from Corresponding New Zealand Patent Application No. 583904.
Examination Report dated Jul. 13, 2011 from Corresponding New Zealand Patent Application No. 583904.
Examination Report dated Jun. 1, 2011 from Corresponding New Zealand Patent Application No. 583904.
Examination Report dated Mar. 19, 2010 from Corresponding New Zealand Patent Application No. 583904.
Examination Report dated Mar. 23, 2011 from Corresponding New Zealand Patent Application No. 583904.
Response dated Mar. 3, 2011 to Examination Report dated Mar. 19, 2010 from Corresponding New Zealand Patent Application No. 583904.
Response dated Nov. 11, 2011 to Examination Report dated Jul. 13, 2011 from Corresponding New Zealand Patent Application No. 583904.
Response to Examination Report dated Apr. 28, 2011 from Corresponding Australian Patent Application No. 2008312668.
Crossover XPG 5 LED 50 and Crossover XPG HL 5 LED 68 Product and Installation Sheet (2009).
European Search Report dated Mar. 11, 2011 from Corresponding European Application No. 08166681.0.
European Search Report dated Nov. 3, 2011 from Corresponding European Application No. 08166681.0.
Examination Report dated Feb. 2, 2012 from Corresponding Mexican Patent Application No. MX/a/2010/002973.
Examination Report dated Jan. 26, 2012 from Corresponding New Zealand Patent Application No. 594651.
Examination Report dated Mar. 1, 2011 from Corresponding Australian Application No. 2010200941.
Examination Report dated Oct. 18, 2011 from Corresponding Canadian Patent Application No. 2,696,492.
Examination Report from Corresponding Australian Application No. 2010200941 mailed Jul. 22, 2011.
Examination Report from Corresponding New Zealand Patent Application No. 594651 dated Aug. 23, 2011.
Extended European Search Report dated Dec. 23 2010 from Corresponding European Application No. 10157195.8.
Installation and Assembly Instructions for Crossover XAS/XAM Area Series & XRS/XRM Roadway Series, LSI Industries, Inc. (2009).
International Search Report and the Written Opinion dated Dec. 19, 2008 from Corresponding PCT Application PCT/US2008/079810.
International Search Report and Written Opinion for Corresponding PCT Application No. PCT/US08/079810 (8 pages).
LED Garage Light (XPG-HL) Product Sheet, Crossover, Solid-State Lighting, LSI Industries, Inc. (2009).
LED Garage Light (XPG) Product Sheet, Crossover, Solid-State Lighting, LSI Industries, Inc. (2009).
LED Multi-Purpose Light (XPG-HL) Product Sheet, Crossover, Solid-State Lighting, LSI Industries, Inc. (2009).
LED Multi-Purpose Light (XPG) Product Sheet, Crossover, Solid-State Lighting, LSI Industries, Inc. (2009).
LED Wall Light Product Sheet, Crossover, Solid-State Lighting, LSI Industries, Inc (2009).
Office Action dated Aug. 3, 2011 from Corresponding Mexican Application No. MX/a/2010/004237.
Office Action dated May 9, 2012 for Corresponding Japanese Patent Application No. 2010-066374.
Office Action dated May 9, 2012 for Corresponding Japanese Patent Application No. 2010-530063.
Philips Apollo Streetlight Overview Product Sheet (2009).
Philips Lumileds Lighting Company, Luxeon Emitter Technical Data Sheet DS25, downloaded from www.luileds.com/pdfs/DS25.PDF (2007).
Response dated Dec. 16, 2011 to the Examination Report dated Aug. 23, 2011 from Corresponding New Zealand Application No. 584364.
Response dated Dec. 23, 2011 to the Examination Report dated Oct. 18, 2011 from Corresponding Canadian Patent Application No. 2,696,492.
Response dated Feb. 27, 2012 to the Examination Report dated Jul. 22, 2011 from Corresponding Australian Application No. 2010200941.
Response dated Jan. 5, 2011 to the Examination Report dated Aug. 23, 2011 from Corresponding New Zealand Patent Application No. 594651.
Response dated Jul. 1, 2011 to the Examination Report dated Mar. 1, 2011 from Corresponding Australian Application No. 2010200941.
Response dated Jun. 17, 2011 to Extended European Search Report dated Dec. 23, 2010 from corresponding European Application No. 10157195.8.
Response dated Mar. 1, 2012 to Examination Report dated Jan. 26, 2012 from Corresponding New Zealand Patent Application No. 594651.
Response to Office Action from corresponding Mexican Application No. MX/a/2010/004237 dated Aug. 5, 2011.
Response to the Examination Report dated Feb. 22, 2012 from Corresponding Mexican Patent Application No. MX/a/2010/002973.
Response dated Jul. 1, 2011 to the Examination Report dated Jun. 1, 2011 from Corresponding New Zealand Patent Application No. 583904.
Response dated May 13, 2011 to the Examination Report dated Mar. 23, 2011 from Corresponding New Zealand Patent Application No. 583904.
Supplementary European Search Report dated Dec. 4, 2012 from corresponding EP Patent Application No. 08166681.
Office Action dated Jul. 25, 2012 from Corresponding Canadian Patent Application No. 2701653.
Response dated Aug. 17, 2012 to Office Action dated Jul. 25, 2012 from Corresponding Canadian Patent Application No. 2701653.
Response dated Aug. 28, 2012 to Office Action dated Feb. 21, 2012 from Corresponding Japanese Patent Application No. 2010-066374.
Response dated Oct. 3, 2012 to Office Action dated Mar. 30, 2012 from Corresponding Japanese Patent Application No. 2010-530063.
Office Action dated Aug. 9, 2012 from Corresponding Chinese Patent Application No. 200880010491.0.
Office Action dated Aug. 15, 2012 from Corresponding Canadian Patent Application No. 2696492.
Office Action dated Apr. 24, 2013 from Corresponding Chinese Patent Application No. 200880010491.0.

* cited by examiner

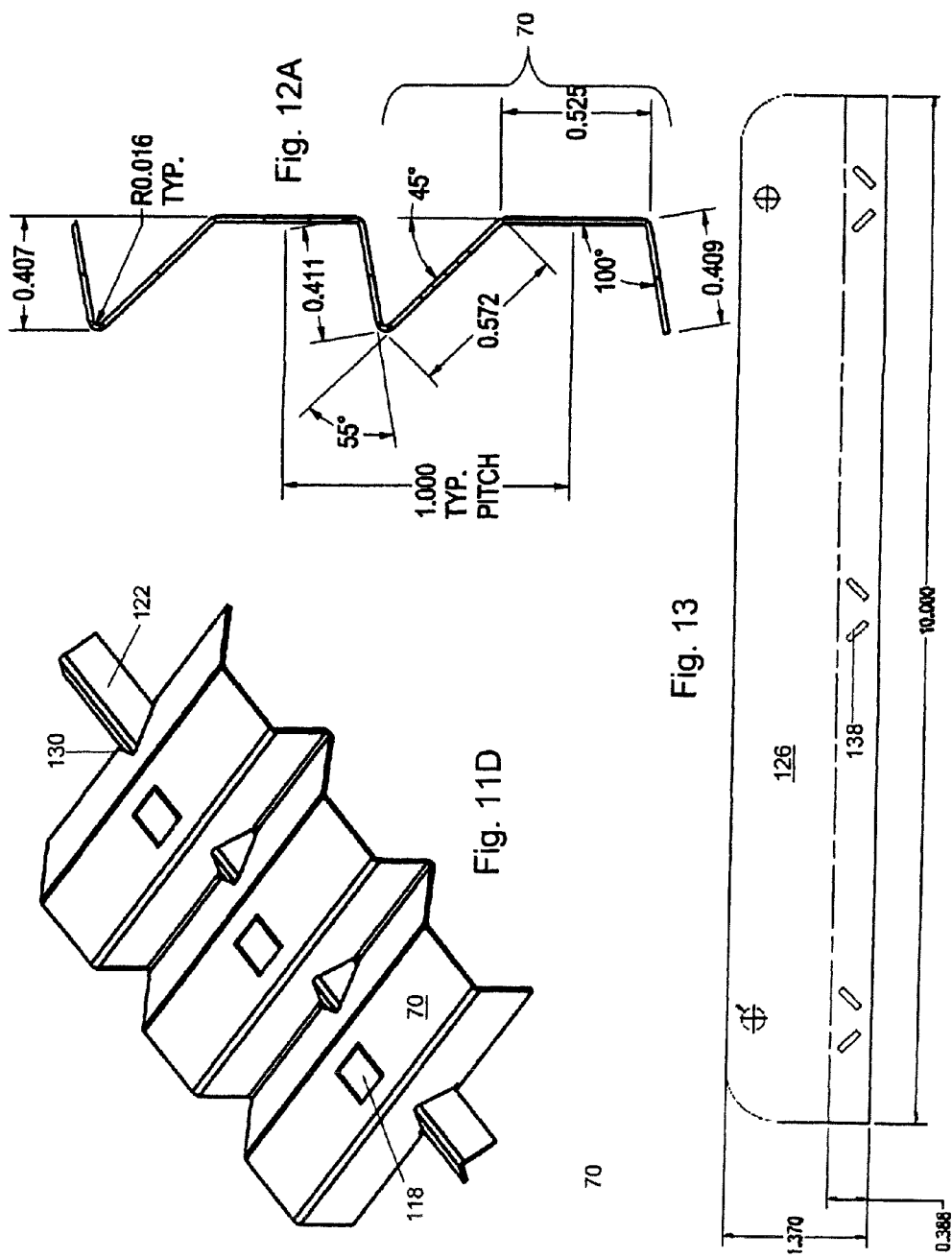

ROADWAY LUMINAIRE AND METHODS OF USE

This application is a continuation application of U.S. patent application Ser. No. 13/800,955 filed Mar. 13, 2013, now allowed, which is a continuation application of U.S. patent application Ser. No. 13/429,863 filed Mar. 26, 2012, now issued as U.S. Pat. No. 8,434,893, which is a continuation application of U.S. patent application Ser. No. 13/150,625 filed Jun. 1, 2011 and now issued as U.S. Pat. No. 8,177,386, which is a continuation application of U.S. patent application Ser. No. 12/754,090 filed Apr. 5, 2010 and now issued as U.S. Pat. No. 8,002,428, which is a continuation application of U.S. patent application Ser. No. 12/166,536 filed Jul. 2, 2008 and now issued as U.S. Pat. No. 7,828,456, which claims priority to U.S. Provisional Patent Application Ser. No. 60/980,562 filed Oct. 17, 2007.

FIELD OF THE INVENTION

The present disclosure relates generally to a luminaire and, more particularly, to a luminaire for lighting a roadway or the like and, even more particularly, to a luminaire directing light from its one or more light sources in more than one direction. The disclosure finds particularly useful application when the luminaire employs multiple light sources including, in one embodiment, one or more light emitting diodes (LEDs).

BACKGROUND OF THE INVENTION

Highway and roadway lighting have used incandescent and more recently high intensity discharge (HID) luminaire s that can provide adequate amounts of lighting, but which have several drawbacks, including frequent (at least annually) luminaire failures and uneven lighting of the traffic surface. Such lighting also disperses the light in all directions around the luminaire. Uncontrolled light can be wasted in lighting areas around the roadway that do not require lighting, and contributes to unwanted "night lighting" which can interfere with the preservation and protection of the nighttime environment and our heritage of dark skies at night.

As advances in the quality and energy efficiency of lighting sources such as LEDs have improved, their production costs have gone down. As a result, LEDs, for example are being commonly used in area lighting applications. Initial efforts to incorporating LEDs into lighting fixtures have involved retrofitting LEDs into conventional luminaries or onto or into the shape of conventional lighting luminaire s.

Improvements in LED lighting technology has led to the development by Osram Sylvania of an LED having an integral optic that emits a significant portion of the LED light bilaterally and at high angle α (about 60°) from nadir, which is available as the Golden DRAGON® LED with Lens (hereinafter, "bilateral, high angular LED"). FIG. 1A is a representation of the bilateral, high angular LED 252 showing the direction and angle of the lines 255 of maximum light intensity emitted by the LED, substantially in opposed designated ±Z axes. Progressively and significantly lower levels of light intensity are emitted at angles in the Y-Z plane diverging from lines 255 and along vectors directed toward the transverse direction (±X axes) normal to the image of the figure. The radiation characteristics of the LED 252 are shown in FIG. 1B.

These LEDs can be used in a matrix arrangement in a lighting apparatus to distribute more of the light emitted from the LEDs, for example, along the length of the roadway and down both sides of the light pole. In a typical matrix, the LEDs are arranged in eighteen longitudinal rows, with five bilateral, high angular LEDs in each row. The ninety total bilateral, high angular LEDs are arranged with 36 bilateral, high angular LEDs (42%) aligned with its Z axes aligned within the housing along the longitudinal direction L, to align with the direction of the roadway; 27 bilateral, high angular LEDs (29%) aligned with its Z axes aligned +10° (toward the roadway) from the longitudinal direction L in the direction of traffic; and 27 bilateral, high angular LEDs (29%) aligned with its Z axes aligned −10° (away from the roadway) from the longitudinal direction L in the direction of traffic.

The LED lighting apparatus can be retrofitted onto existing light poles, or installed onto new light poles, for illuminating the lanes of all types of roadways, including two-way streets up to multi-lane interstate highways. As shown in FIG. 2A, the light poles are typically mounted on the sides of such roadways, typically several meters into the berm from the edge 5 of the roadway so as not to become an obstruction to traffic. Arm 4 extending from the pole 3 is configured to hold the luminaire outward toward the roadway 7. Because a large portion of the light emitted by the bilateral, high angular LEDs is directed longitudinally and in the directions (±L) that the roadway 7 runs, and since the roadway luminaire is typically mounted near the berm of the roadway 7 or only partly into the first or near lane 7n, adjustments to the luminaire must be made to ensure that emitted light is projected out into outer lanes (for example, to outer lane 7o of the roadway. It is known to accomplish the projection of the emitted light by tilting the luminaire on an angle β from nadir to angle and disperse a significant portion of the light to the outer lane 7f or outer lanes of the roadway 7. Such angle β is typically between about 20° to about 70°, and more typically about 30°. FIG. 2B shows a simulated light distribution pattern formed by at least two conventional LED lighting apparati 18a and 18b secured to the arm of the lighting pole, positioned 30 feet (9.1 m) above the roadway and extending over the roadway four feet (1.2 m) in from the near edge 5 of the roadway, and positioned 70 feet (21 m) apart. The rectangular light distribution pattern 80 is defined by the traverse centerlines of the apparati 18a and 18b, the near edge 5, and a simulated outer edge 9 extending parallel to and 20 feet (6.1 m) laterally from the near edge 5. Each LED lighting apparati has 90 LEDs arranged in an array of 18×5 LEDs, consisting of 18 LEDs on a substrate at 1 inch (2.54 cm) spacing, with the five parallel substrates oriented in the traverse T direction, and spaced apart by about 1 inch in the longitudinal L direction. Each LED is the bilateral, high angular LED 252, as shown in FIG. 1, and is powered with 1 watt and emits 48 lumens.

While providing a significant improvement in the distribution of light along the length of the roadway, the tilting of the luminaire at high angles β from nadir also directs light toward the horizon (H), contributing to unwanted "night lighting" and creating the potential for direct light glare in the eyes of drivers and passengers in automobiles and trucks, particular those in outer lane 7f or lanes farthest from the near edge 5, including those traveling in roadway lanes with traffic moving in the opposite direction. The light directed into the horizon is wasted light resulting in wasted energy costs to power the LEDs. Tilting the luminaire is thus an inefficient manner of obtaining a proper light distribution.

SUMMARY OF THE INVENTION

The present disclosure relates to a lighting apparatus configured to efficiently distribute light, and in particular, efficiently distribute light for illuminating roadway surfaces and, more particularly the illumination of roadway surfaces with one or more lighting sources such as LEDs in an exemplary embodiment.

In one embodiment, the present disclosure relates to a lighting apparatus having: a housing comprising a planar base; a plurality of light sources forming a matrix having a plurality of rows oriented in a designated opposed longitudinal directions L, and a plurality of columns oriented in an opposed direction T transverse to the direction L; and a plurality of elongated reflectors having a reflective surface, each reflector having an elongated proximal edge disposed adjacent to at least one of the plurality of rows, and a distal edge, wherein the reflective surface faces the at least one row, and each reflective surface being oriented in a plane generally normal to the planar base, for reflecting a portion of the light from the at least one row of light sources emitted in a −T direction, toward the +T direction.

The present disclosure also relates to the lighting apparatus above wherein the light sources are LEDs and, more particularly wide-angle LEDs, each wide-angle LED having a light-refracting optic lens that distributes a significant portion of the LED light in ±Z direction and at an angle α from nadir of at least about 50°, and wherein plurality of wide-angle LEDs are oriented on the planar base with the ±Z direction oriented substantially along the ±L direction.

The present disclosure further relates to a roadway lighting assembly for lighting a roadway, comprising: a lighting apparatus according to any one of the above lighting apparati; and a housing for associating the lighting apparatus with a conventional street light pole, wherein the planar base of the lighting apparatus is positioned substantially parallel to the plane of the surface of the roadway.

In another aspect, a lighting apparatus is shown and described. In one embodiment, the apparatus includes a base member and a directional member. The base member includes a first surface having a plurality of reflective elements extending therefrom. The base member also includes a plurality of openings arranged in a pattern such that each opening being configured to receive a respective light source. The directional member has a portion of a reflective surface positioned relative to at least one opening to reflect light radiating from a lighting source disposed within the opening towards a portion of at least one of the reflective elements extending from the base member.

In various embodiment, the first surface of the base member can be reflective. Also, the base member and the reflective elements can be formed integrally with one another. The cross-section of a portion of the reflective member can be substantially v-shaped. The lighting apparatus can also include a pair of side members.

In another aspect, the disclosure is directed to a luminaire. The luminaire, in one embodiment, includes a housing, a plurality of lighting sources, a base member, and a plurality of directional members. The plurality of lighting sources can be arranged in a substantially matrix-like pattern.

The base member is disposed within the housing and includes a first surface having a plurality of integrally formed reflective elements extending therefrom. The base member also includes a plurality of openings arranged in a complementary matrix-like pattern. Each opening receives a respective light source.

The plurality of directional members are spaced apart from one another and extend substantially perpendicular to the plurality of reflective elements. Each of the directional members passes through a portion of a respective set of reflective elements such that a portion of a reflective surface of the directional members is positioned to reflect light radiating from a lighting source in a respective opening.

The disclosure additionally relates to the ornamental shape and design of the lighting apparatus.

BRIEF DESCRIPTION OF THE DRAWINGS

FIG. 11D is a blown-up isometric view of a portion of the reflector of FIG. 10.

FIG. 12A is a side view of a portion of the reflector of FIG. 10 show without a directional member.

FIG. 13 is a top view of an embodiment of a side member of the reflector of FIG. 10.

DETAILED DESCRIPTION OF THE INVENTION

Figure 2B:
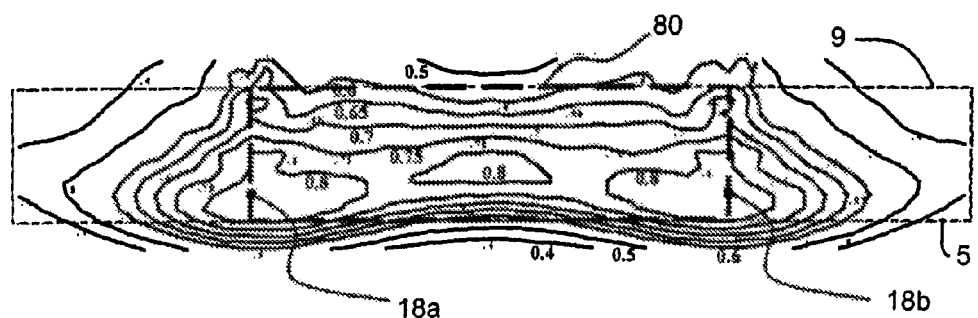
FIG. 2B shows a plan view of a simulated light distribution pattern formed by two adjacent conventional roadway lighting apparatus on a roadway as shown in FIG. 2A.
Figures 2A, 3:
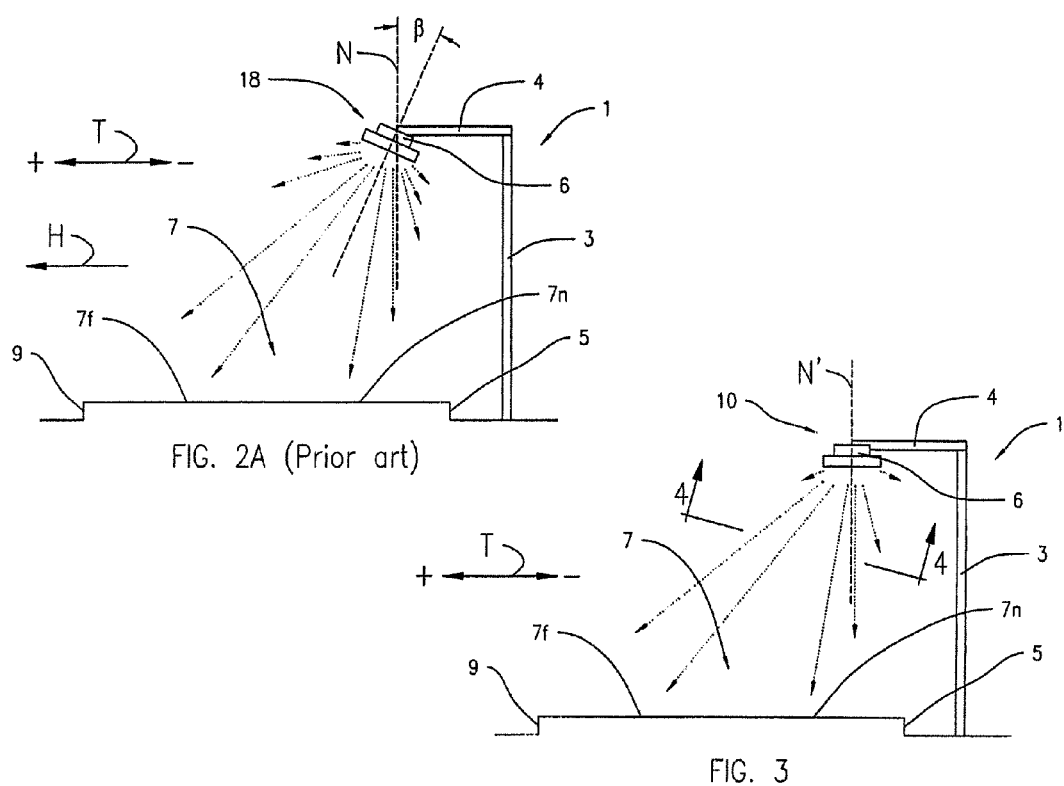
FIG. 2A shows an elevation view of a conventional roadway lighting apparatus using the wide-angle LED of FIG. 1A, with the luminaire tilted at an angle β upwardly in a direction transverse to the direction of the roadway.
FIG. 3 shows an elevation view of one embodiment of a lighting apparatus of the present disclosure positioned on a light pole along a roadway.

FIG. 3 shows an embodiment of the lighting apparatus 10 of the present disclosure comprising a roadway light pole assembly 1 that includes a pole 3, an arm 4 and pole adapter 6. The pole 3 is positioned away from the near edge 5 of the roadway 7, having a near lane 7n and a far lane 7f. FIG. 5 shows an exploded view of the lighting apparatus of FIG. 4.

Figures 4, 4A:
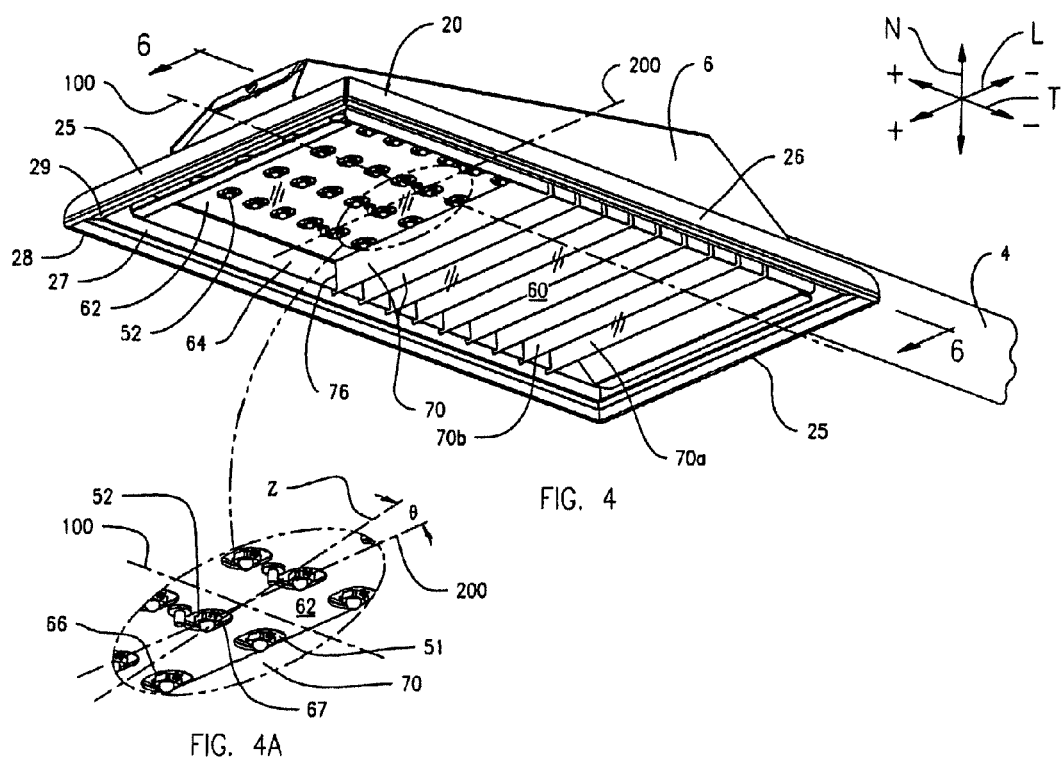
FIG. 4 shows a perspective view of the lighting apparatus as viewed from line 4-4 of FIG. 3.
FIG. 4A shows a detailed view of a portion of the FIG. 4 apparatus, illustrating the positioning and orientation of a light source.
Figure 5:
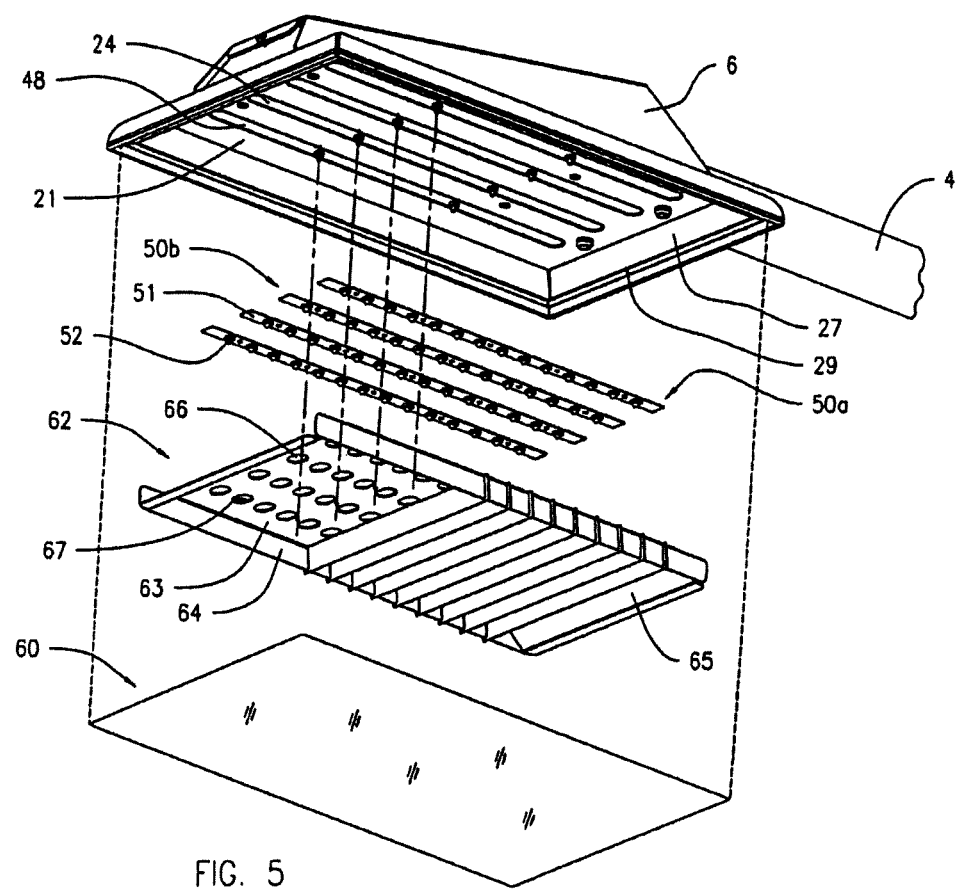
FIG. 5 shows an exploded view of the lighting apparatus of FIG. 4 in an embodiment employing LEDs as light sources.
Figure 6:
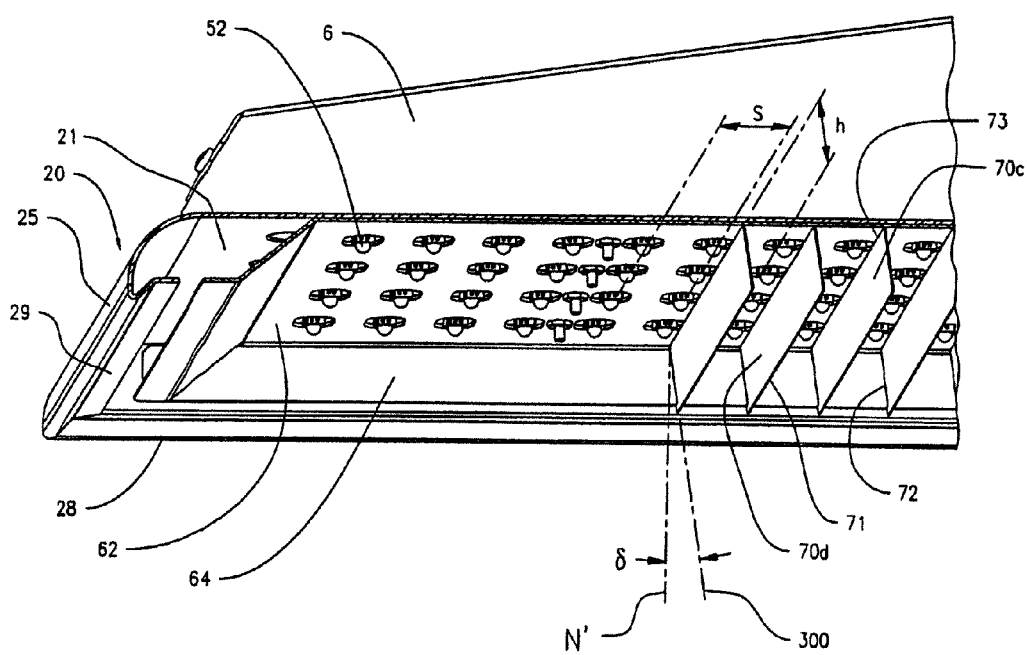
FIG. 6 shows a cross sectional view of the lighting apparatus of FIG. 4 as viewed from line 6-6.

FIG. 6 shows a transverse sectional view of the apparatus of FIG. 4, including a housing 20 having a rectangular planar base 21 and a plurality of light source assemblies 50. In the depicted embodiment, the light sources are comprised of LEDs. The lighting apparatus 10 of the present disclosure can, however, employ any type of light source known to date or hereinafter created. Although, the remainder of the specification describes various embodiments of the disclosure employing LEDs as the light sources, the LEDs can be replaced with any light source known to date or hereinafter created. In the embodiment depicted in FIG. 4, the light sources comprise LED assemblies 50a and 50b (as depicted in FIG. 5), affixed to an underside surface of the planar base 21. The planar base 21 has an opposed upper surface that attaches, directly or indirectly, to the pole adaptor 6 for securing the housing 20 to the extending arm 4 of a roadway or parking lot light pole 3. Existing extending arms 4 are typically positioned horizontal to the roadway 7, although some existing arms can be upwardly tilted slightly, generally less than about 5° from true horizontal to the roadway 7. Other housing shapes can be made in accordance with the present disclosure, including round, square, oval and other irregular shapes.

The housing 20 of the lighting apparatus embodiment depicted in FIG. 4 includes sidewalls, illustrated as pairs of opposed perimeter sidewalls 25 and 26, disposed around the perimeter of the planar base 21. The sidewalls 25, 26 are configured to extend from an outer edge of the planar base 21, to a distal edge 28, and may be formed integrally with the planar base of the housing. The protruding sidewalls 25, 26 define a cavity 48 within which the LED assemblies 50 are mounted. In the embodiment depicted in FIG. 5, the housing base 21 comprises recesses to accommodate the lighting assemblies 50. In the embodiment of FIG. 5, the light assemblies 50 are each comprised of elongated substrate 51 on which multiple LEDs 52 reside. The scope of the present disclosure contemplates any size and shape of substrates each with any number of LEDs (or other light source) thereon such that each LED could be on a dedicated substrate or every LED of the lighting assembly could be included on a single substrate of whatever shape and size necessary or desired. In the illustrated embodiment, the sidewalls are curved and extend downward. As depicted in FIG. 5, the base 21 may comprise recesses 24 to accommodate the size and shape of the light assemblies 50. The light assemblies could, however, be placed on the base 21 without the use of recesses 24. Other sidewall configurations can be planar and rectilinear. The sidewalls may be joined at their adjacent beveled ends to form a substantially enclosed wall around the perimeter of the planar base 21 of the housing to define the cavity 48. In one embodiment, a planar ledge or rim 29 extends inwardly from proximate the distal edges 28 along the lengths of the sidewalls to define an opening 27, to provide a means for positioning and affixing, proximate thereto, the perimeter edge of a lens 60, for covering the opening 27 to the cavity 48 in the housing 20.

In an aspect of the disclosure, the lighting assembly 10 can also include a cover plate 62 comprising abuse 63 having a plurality of openings 66 defined by opening edges 67. The cover plate 62 is positioned in the cavity 48 of the housing, over the LED assemblies 50, with the openings 66 registered around the LEDs 52 as shown in FIG. 6. The cover plate 62 is typically secured to the housing 20 by known means, including threaded bolts and nuts, screws, clips, latches, and rivets. The side portions 64 and end portions 65 of the cover plate 62 generally extend outward from the base 63, and are tapered outwardly toward the distal edge 28 of the housing 20, or beyond the rim 27, within the cavity 48, or short of the rim 27 as shown in FIG. 6. The cover plate 62 can be made from a reflective material or have a reflective coating or be highly finished to provide a reflective surface finish, or other decorative pattern. The cover plate 62 also serves to disguise the electronic circuitry and, when the light sources are LEDs, the substrates 51 of the light source assemblies 50 and improve the appearance. The openings 66 can be of any shape, such as circular or oval, preferably matching the shape of the associated light source employed, though other opening shapes can be used. The cover plate 62 can be secured in place to the housing by any of the various known conventional means, such as with rivets, screws, bolts, clips, latches, and adhesives. In certain embodiments, the cover plate 62 can be adhered or attached to the inside surface of the planar base 21, advantageously when the LED assemblies are dispose within recesses 24 formed in the planar base 21, as described below.

The depicted light source assemblies 50 comprise a substrate 51 on which is mounted a plurality of LEDs 52, in a row. An LED may be a unit consisting of the light-generating diode and an associated optic or the light-generating diode without the optic. When present, the associated optic can be affixed directly to the diode, can be affixed to the substrate in a position next to or in contact with the diode by separate positioning and orientation means, or located or held without the assistance of the substrate or diode. The LED can be of any kind and capacity, though in a preferred embodiment, the plurality of LEDs each provide wide-angle light distribution pattern oriented primarily in designated ±Z axes. A typical LED used in the present disclosure is the wide-angle LED known herein as the bilateral, high angular LED 252, such as Golden DRAGON® LED manufactured by Osram Sylvania. The LED assemblies 50 are shown disposed in position within the housing 20 along a transverse axes "T" of the LED lighting apparatus 10, though they can also be positioned along or at an angle to the longitudinal axes ±L. The number of LEDs on a substrate, can vary according to the lighting need, and typically range from about 5 to about 20 LEDs, or more. An increased number of LEDs may be employed on a substrate to provide the amount of lighting necessary for a wider roadway, or more generally, for a transversely wider lighting pattern. The number of substrates likewise can vary with the lighting need, and may include about 4 to about 10 substrates. The spacing between these adjacent LED lighting assemblies may be dependent upon the angle α of the bilateral, high angular LED.

The lighting apparatus of the present disclosure can also include an intermediate heat transfer means which may be accomplished by cover plate 62 (not depicted), such as a sheet of aluminum, that can be disposed over and in heat-transferring contact with the top surface of the substrate, which when using LEDs is typically a printed circuit board (PCB), to extract and conduct heat away from the light sources. Like the cover plate 62, the intermediate heat transfer means has openings that register over the light sources to allow emission of light. The openings are formed proximate to the light sources, which is the source of the heat generated, to optimize heat extraction.

In the embodiment shown in FIG. 4A, the Z axis of each of the wide-angle LEDs 52 in the matrix is disposed an angle θ from the row of LEDs along line 200, which in the illustrated embodiment is shown parallel to longitudinal direction L, where the angle θ typically ranges within about ±15°, more typically within about ±10°. The angle θ of one or more of the LEDs is typically varied proportionally with the required transverse projection of light from the luminaire. Thus, for a wider roadway requiring a wider transverse projection of light from the luminaire, the absolute value of the angle θ is increased. The typical distribution and layout of the plurality and matrix of LEDs provides a distribution of the angle θ among the matrix of LEDs, wherein about 15-35% of the LEDs have an angle θ equal to about +5° to +15°; about 15-35% of the LEDs have an angle θ equal to about −5° to −15°; and about 30-70% of the LEDs have an angle θ equal to about −5° to +5°.

At least one reflector 70 is disposed generally in the longitudinal direction L of the lighting apparatus 10. The one or more reflectors redirect light as needed or desired. Employing multiple reflectors 70 can facilitate redirecting light emanating from different light sources in different directions. This permits creation of zones of light intensity in desired locations, such as a near and far lane of a roadway. By directing the light using reflectors 70, inefficiencies can be avoided such as with the tilting of light apparatus 18 at angle .beta. in FIG. 2a. Each of the one or more reflectors 70 comprises an elongated, rectangular reflective surface, usually but not necessarily planar, that faces an adjacent line of light source, and having a longitudinal proximal (or directionally upper) edge 73 (see FIG. 6) that is positioned next to, and typically directly adjacent, a row 200 of light sources. Although depicted as redirecting from LEDs, the reflectors 70 of the instant disclosure can be employed to redirect light from any light source. Positioning the proximal edge 73 of the reflector vertically adjacent the LED allows the reflector to redirect light. Each reflector 70 typically has first and second side ends 72, and a distal (or directionally lower) edge 71 that extends away from the LED. A reflector 70 can be associated with some or all of the plurality of rows of LEDs. The reflector 70 can be disposed proximate several consecutive rows of the LEDs, including those rows at the −T end of housing.

The reflector 70 is typically a planar sheet that is sufficiently rigid to maintain its shape. A typical planar sheet material is about 5-250 mil (about 0.1-6 mm) thick. The reflective surface is typically a finished surface having a reflectance of at least 86%, more typically of at least 95%. An exemplary reflector is a sheet of aluminum having a MIRO 4 finish, manufactured by Alanod GMBH of Ennepetal, Germany, on at least one side that faces the adjacent row of LEDs. The reflectors can be of any size, shape or orientation in order to redirect light as desired. Two of the contemplated reflector configurations are depicted in FIGS. 8 and 9 as being integral with cover plate 62, thereby lessening the total number of discrete elements in the lighting apparatus.

Conventional hardware secures or fixes the reflectors 70 in position to the housing 20. In this embodiment, the one or more reflectors 70 can be positioned on the reflective surface and secured to the sides 64 of the cover plate 62. The sides 64 are oriented generally in the transverse direction ±T and disposed at the opposed sides of the inner cavity 48 of the housing 20. Each side 64 has slots 76 formed in the inwardly facing sides that position and aid in retaining the longitudinal ends 72 of the reflectors 70. The slots define the planar angle of the reflectors. The slots can be arranged at the same angles, and at equal distances along the side 64, or at different angles or distances.

The one or more reflectors 70 can also be formed integrally with the sheet material of the reflective surface of the cover plate 62, by folding the cover plate material along the proximal edge and at the distal edge, and folding again at the proximal edge to form a series of reflector 70. FIG. 8 and FIG. 9 show two configurations of the cover plate 62 folded to provide the reflectors 70. When integrally formed with the cover plate 62, the reflectors 70 assist in dissipating heat from the light sources.

Figure 8:
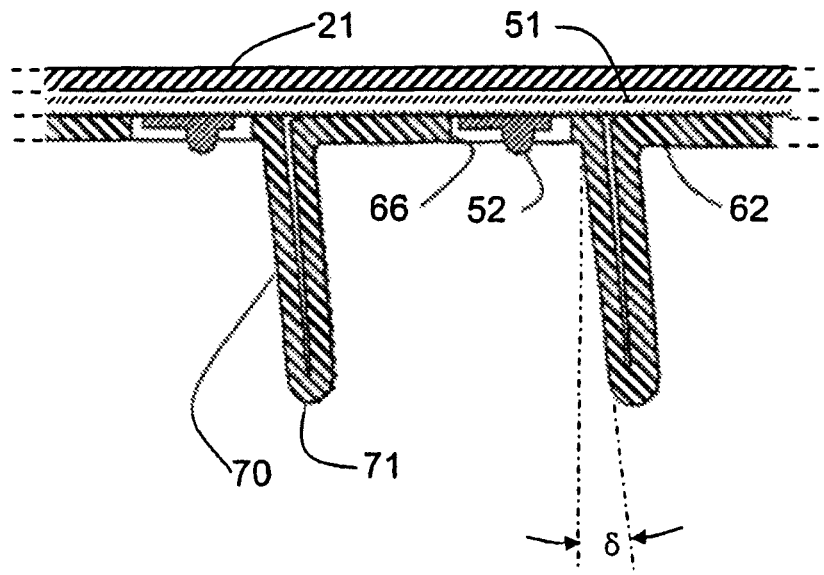
FIG. 8 shows a cross sectional view of an embodiment of the reflector formed from the cover plate.
Figure 9:
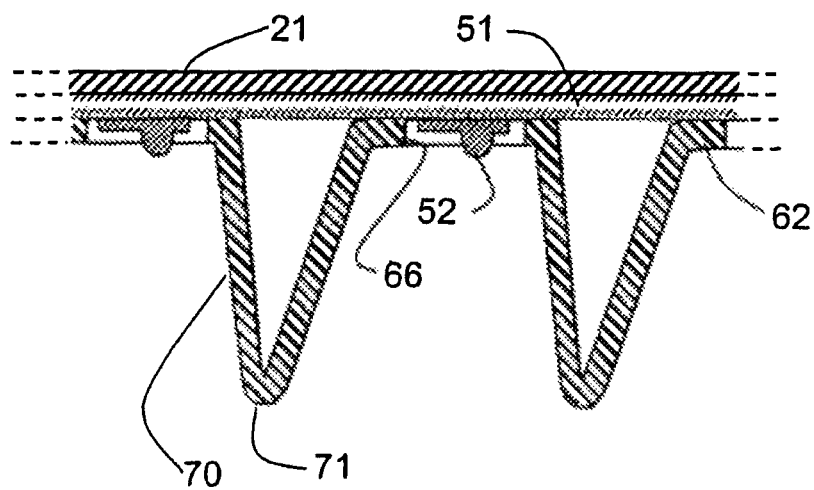
FIG. 9 shows a cross sectional view of another embodiment of the reflector formed from the cover plate.

The elongated reflector 70 is typically planar, with its plane 300 oriented at an angle δ from a line N' normal to the planar base 21 of the housing, as shown in FIGS. 6 and 8. In one embodiment, the present disclosure is configured for a conventional roadway or parking light pole where the line N' lies substantially along true vertical. The angle δ of the reflector 70 provides improved distribution and control of light without unwanted direct glare and "night lighting", and provides adjustability when the base of the housing 20 is slightly angled from the true horizontal plane such as when retrofitting a pre-existing light pole. The angle δ is typically within the broad range of about 0° to about −20°, wherein a negative angle δ is where lower edge 71 tilts away from the adjacent light source in the −T direction. Any angle δ is, however, contemplated to provide the desired light distribution for a given installation. In one preferred embodiment, the planar base 21 of the lighting apparatus is disposed normal to true vertical or nadir N, and the angle δ is more typically within the following ranges: about −2° to about −18°, about −5° to about −18°, about −5° to about −15°, about −7° to about −15°, about −7° to about −12°, and about −10° to about −15°. Where the planar base 21 is tilted upward on a slight angle β from true vertical, toward the +T direction, the angle δ can be disposed at a slightly more negative angle, relative to normal line N'. Where the roadway surface is not normal to true vertical, the planar base 21 may optimally be oriented parallel to the roadway surface Referring to FIG. 6, the spacing and distance of the planar reflector 70 from the light sources, and the height (h) of the reflector 70, are selected to guide the emitted light toward the roadway (in the +T direction), and to minimize obstructing emitted and reflected light from one reflector 70c that might strike the back surface of an adjacent reflector 70d. The reflector is preferably positioned with its upper edge 73 adjacent to the light sources in the row. The height "h" of the reflector may be about the same as the spacing distance, designated "s", between adjacent rows of light sources. The ratio h:s is preferably about 0.5-2:1, and more preferably about 0.5-1.2:1.

In another embodiment, the reflectors 70 can be secured directly to the housing, or indirectly via a separate bracket or other known means that is affixed to the housing 20 when a cover plate is not inserted into the cavity 48. The reflectors can be affixed within slots, or other known securement means, such as with rivets, screws, bolts, clips, latches, and adhesives.

The associated electronic and electrical components for powering and controlling the luminaire may be disposed within the pole adapter 6, and receive electrical power wiring and optional control wiring via the arm 4 of the pole. The circuitry for controlling and powering the light sources 52 is known to those of ordinary skill in the art and can be mounted in part or in whole on a PCB, or located remotely. The lighting apparatus 1 typically receives an external power supply having an off-line voltage of 110-277 V, depending upon the local power system. In one embodiment, an external low voltage power system can be provided that converts the off-line voltage of 110-277 V AC from the local power system to the 24V constant current required for the light source power and control components of the light source assembly. In another embodiment, the lighting apparatus is configured for installation of an integrated power and control module, which converts off-line power directly to the low voltage constant current power, which may be required by the light source. The drivers and controllers of LED boards, when employed, are routinely powered with 24V constant current, which can be mounted within the housing 20.

The housing may be constructed of aluminum by well-known methods such as formed sheet metal, die casting, permanent mold casting, machining or sand casting. Other parts, such as the cover plate, can also be made of aluminum. The housing and other parts can also be made of other metals such as bronze and brass. The parts can also be made of engineering plastic materials, such as by injection molding.

A typical method of forming the sheet metal aluminum housing employs a brake press that secures the base portion in a plane, and folds the sides to the desired angle relative to the base. The folded sides are then confined in position while welding together the ends of the sidewalls, which maintains the planar shape of the base. The light source assembly, cover plate, power frame and other components can be assembled to the housing a variety of known fastening or fixing means, including screws, bolts, rivets, welds, ties, latches, adhesives, and other known means. Threaded pins can be threaded or secured into tapped holes in the underside of the housing, and can be extend through holes formed in the cover plate and power frame, and optionally through the light source assembly board, and can be capped with a nut to secure the elements to the housing.

In an alternative embodiment of the luminaire, the light source assembly can be disposed within the recess 24, discussed above, formed in the planar base of the housing, as shown in FIG. 5 and as described in co-pending U.S. provisional patent application 60/953,009, filed Jul. 31, 2007, the disclosure of which is incorporated herein by reference. The recess is typically formed into the planar material of the planar base, such as by stamping or forming. The floor of each recess can lie in the same plane as the planar base, or in a plane offset from the planar base, typically in a direction opposite the LED attachment surface. The recesses are typically substantially linear, with rounded ends, though other recess and end shapes can be used, as needed, such as round, square, oval, and other irregular shapes.

Each recess has a wall that defines the perimeter of the recess. Typically, the wall is continuous around the perimeter of the floor, though in some embodiments, there can be a break in the wall. The height of the wall typically defines the depth of the recess, for purposes of positioning and securing the light source assembly, as discussed herein after.

The light source assembly can be assembled into the recess, typically by placing the light source assembly into heat-transfer contact with the floor of the recess. Optionally, a small amount of epoxy resin, prior to setting, can be applied to the floor of the recess to act as an adhesive to attach the light source assembly to the housing. The epoxy resin may then be poured over the light source assembly and into and around the void of the recess. The epoxy resin can completely bury or encase the substrate of the light source assembly, although portions of the substrate and the void can be filling or covered with the epoxy. The epoxy resin can then be cured, by means well known in the art, including the passing of time, heat, UV light, and others.

The potting epoxy secures the light source assembly within the recess, and isolates the light source and circuitry from water, dust, dirt and other elements of the environment. The recesses also assist in the assembly of the lighting assemblies, particularly when manufacturing the same by hand, by defining the location of the light source assembly exactly.

When employing LEDs, the substrate 51 is typically a light board, and more typically a PCB. The circuitry for controlling and powering the LEDs can also be mounted on the PCB, or remotely. In one suitable embodiment, the LEDs 52 are white LEDs each comprising a gallium nitride (GaN)-based light emitting semiconductor device coupled to a coating containing one or more phosphors. The GaN-based semiconductor device emits light in the blue and/or ultraviolet range, and excites the phosphor coating to produce longer wavelength light. The combined light output approximates a white output. For example, a GaN-based semiconductor device generating blue light can be combined with a yellow phosphor to produce white light. Alternatively, a GaN-based semiconductor device generating ultraviolet light can be combined with red, green, and blue phosphors in a ratio and arrangement that produces white light. In yet another suitable embodiment, colored LEDs are used, such are phosphide-based semiconductor devices emitting red or green light, in which case the LED assembly 50 produces light of the corresponding color. In still yet another suitable embodiment, if desired, the LED light board includes red, green, and blue LEDs distributed on the PCB in a selected pattern to produce light of a selected color using a red-green-blue (RGB) color composition arrangement. In this latter exemplary embodiment, the LED light board can be configured to emit a selectable color by selective operation of the red, green, and blue LEDs at selected optical intensities.

In one embodiment, the substrate 51 comprises PCB such as FR4 board, and a metal core sheet or strip that is laminated to the FR4 board with thermally-conductive adhesive or epoxy. The metal core strip is typically bonded to the planar base, such as the floor of a recess, with a thermally-conductive adhesive to secure the substrate 51 to the planar base. FR4, an abbreviation for Flame Resistant 4, is a composite of a resin epoxy reinforced with woven fiberglass mat. The metal core aids in heat dissipation from the LED. The LED itself typically has a specialized slug integrated with the LED casing to conduct heat produced by the interior die away from the LED, as is well known in the art. The FR4 board typically has a top layer of copper that can include a network of flattened copper connectors or traces for making electrical connections between components and for conducting heat away from the LED.

In an alternative embodiment, the substrate comprises a non-metallic, non-conductive board, typically an FR4 board, but does not include a metal core layer, which is affixed or attached directly to the planar base to provide the heat dissipation function of the metal core. A thermally-conductive adhesive or epoxy as a bead or layer of adhesive bonds the board to the base. Use of the FR4 board without metal core reduces the cost of the LED assembly by eliminating the metal core, whose function of transferring heat is assumed by the planar base. In addition, elimination of the metal core opens an opportunity to provide flexible or bendable substrates that can be installed into and or attached onto non-planar, curved surfaces. The substrate can comprise a pair of FR4 boards separated by a second copper or conductive layer. Each of the pair of FR4 boards is typically thinner to minimize resistance to heat transfer, while the second copper or conductive layer enhances heat transfer away from the LED. One of either, or both of, the first copper layer or the second copper layer is the network of copper connectors or traces, while the other is primarily a heat transfer aid.

The present disclosure provides several advantages over other methods and devices for lighting roadways using LEDs that provide a wide-angle, bilateral light distribution pattern. The LED housing can be positioned substantially horizontally, normal to nadir, which simplifies retrofitting of the luminaire onto existing light poles. Second, horizontal glare is significantly reduced or eliminated, as compared to the conventional installation of conventional and wide-angle LEDs as shown in FIG. 2A. The adjustability of the angle δ of the reflector 70 also allows the installer to fine tune the reflector installation, regardless of the angle and orientation of the extending arm of the light pole 3. Also, orienting of individual LEDs at an angle ±θ results in directing more light in the +T direction, away from the roadway. The use of reflectors in the present disclosure, disposed inboard and adjacent several of the plurality of rows of LEDs, reflects much of the light directed in the −T direction outwardly in the +T direction.

Figure 1A:
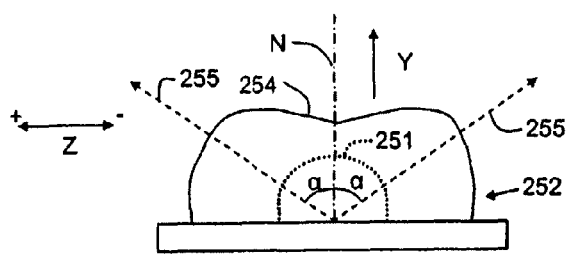
FIG. 1A shows a prior art wide-angle LED with refractor of the type finding use in the present disclosure.
Figure 1B:
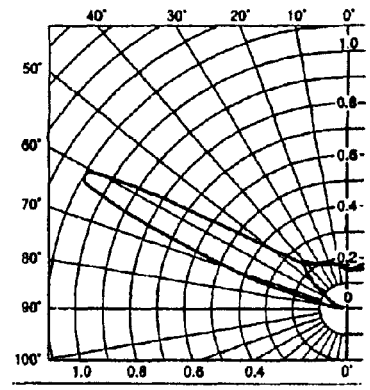
FIG. 1B shows the radiation characteristics of the wide-angle LED of FIG. 1A.
Figure 7A:
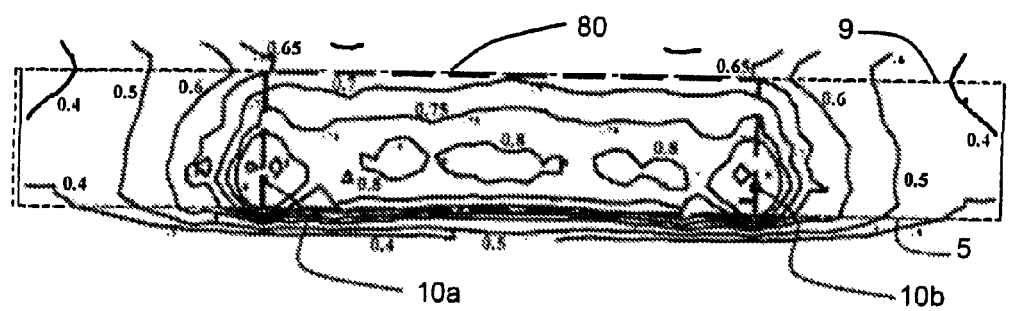
FIG. 7A shows a plan view of a simulated light distribution pattern formed by an embodiment of the lighting apparatus as illustrated in FIG. 3, employing LEDs as light sources and with a reflector angle δ of −10°.
Figure 7B:
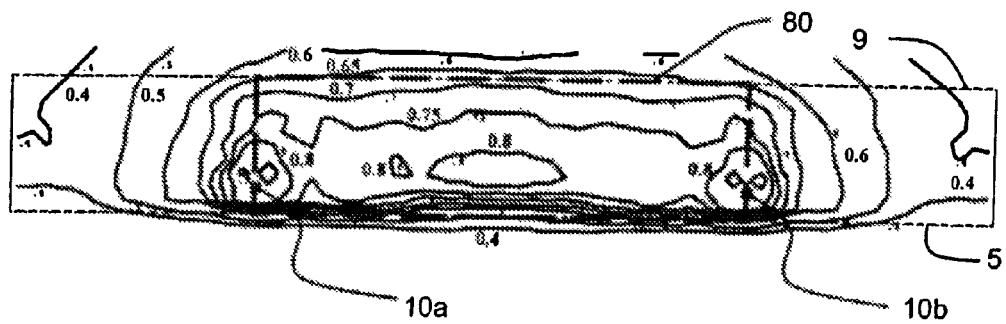
FIG. 7B shows a plan view of a simulated light distribution pattern formed by an embodiment of the lighting apparatus as illustrated in FIG. 3, employing LEDs as light sources and with a reflector angle δ of −15°.

FIGS. 7A and 7B show simulated light distribution patterns formed by at least two LED lighting apparati 10a and 10b of the present disclosure on a roadway, substantially as illustrated in FIG. 3. Each LED lighting apparatus 10a and 10b is secured to the arm of the lighting pole, positioned 30 feet (9.1 m) above the roadway and extending over the roadway four feet (1.2 m) in from the near edge 5 of the roadway. The adjacent two LED lighting apparati 10a and 10b are positioned 70 feet (21 m) apart, and define there between a rectangular light distribution pattern 80 bounded by the traverse centerlines of the apparati 10a and 10b, the near edge 5 and a simulated outer edge 9 extending parallel to and 20 feet (6.1 m) from the near edge 5. Each LED lighting apparati has 90 LEDs arranged in an may of 18×5 LEDs, consisting of 18 LEDs on a substrate at 1 inch (2.54 cm) spacing, with the five parallel substrates oriented in the traverse T direction, and spaced apart by about 1 inch in the longitudinal L direction. Each LED is a bilateral, high angular LED, as shown in FIG. 1, that is powered with 1 watt and emits 48 lumens.

Each of the first 12 rows of LEDs, starting from the −T end of the apparatus, have positioned adjacent thereto a linear reflector of height 0.75 inches (1.9 cm), oriented at an angle δ. The remaining 6 rows of LEDs have no reflector. An apparatus with an angle δ equal to −10° is shown in FIG. 7A, while an apparatus with an angle δ equal to −15° is shown in FIG. 7B. The light distribution pattern in FIG. 7A has slightly more light distributed to the simulated outer edge 9, while the light distribution pattern in FIG. 7B has slightly more light distributed to the simulated inner edge 5. The light distribution patterns generated by the LED lighting apparatus of the present disclosure is at least comparable to the light distribution pattern shown in FIG. 2B of the conventional roadway lighting apparatus shown in FIG. 2A. It can be seen that the LED lighting apparatus of the present disclosure directs less light in the −T direction, away from the near edge 5 of the roadway, as compared to other roadway lighting apparatus.

While the desired light distribution is accomplished in the prior example by the use of reflectors with some rows of light sources but not others, it is contemplated that any desired lighting distribution could also be accomplished by using reflectors with all rows of light sources but configuring the reflectors differently such that two or more reflector configurations are employed. It is contemplated that each reflector could be of a different configuration to reach the desired light distribution.

Figure 10:
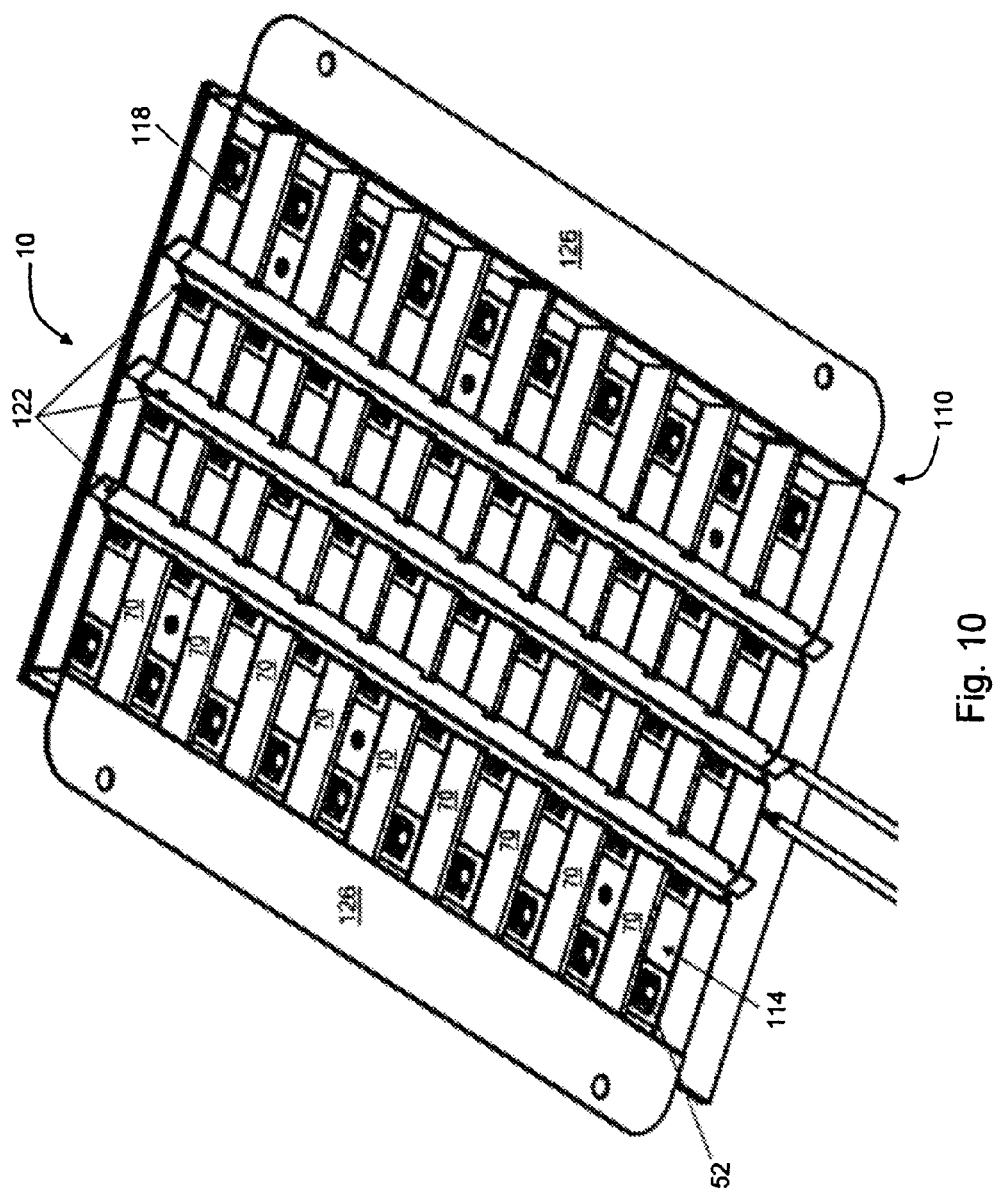
FIG. 10 shows an isometric view of another embodiment of the reflector.

With reference to FIG. 10, another embodiment of a portion of a lighting apparatus 10 is shown and described. The lighting apparatus 10 includes a base member 110 having a first surface 114 having a plurality of reflective elements 70 extending from the base member 110. A plurality of openings 118 are also shown in the base member 110. The openings 118 are arranged in a pattern, such a matrix of rows and columns similar to a checkerboard or some other pattern. Each of the openings 118 is configured to receive a respective light source 52 (e.g., a LED). In other embodiments, the base member has a different shape, for example, substantially circular. That is the base member 110 and the directional members, which are described below, form a wheel-and-spoke type pattern. Also, in other embodiments, the base member 110 and the directional members form a "fan" type configuration.

The lighting apparatus also includes one or more directional members 122. Each directional member 122 has a portion of a reflective surface (not shown) positioned relative to at least one opening 118 of the base member 110 to reflect light radiating from the lighting source 52 disposed within the opening 118. The reflection is generally directed towards a portion of at least one of the reflective elements 70 extending from the base member 110.

The lighting apparatus 10 also includes, in various embodiments, a pair of side members 126 that are attached to or formed integral with the base member 110. Each of the side members 126 has a reflective face. When the side members 126 are attached to the base member 110, the reflective faces typically face one another.

Figure 11A:
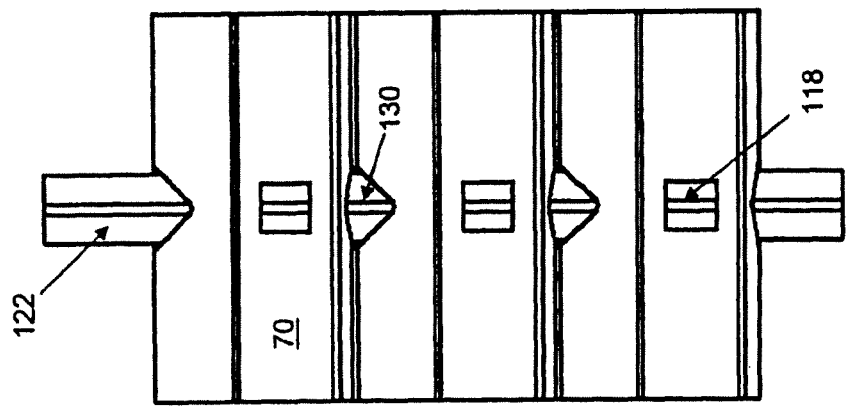
FIG. 11A shows a top view of a portion of the reflector of FIG. 10.
Figure 11B:
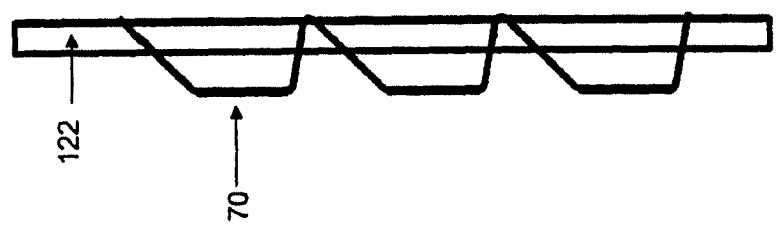
FIG. 11B shows a side view of the of a portion of the reflector of FIG. 10.
Figure 11C:
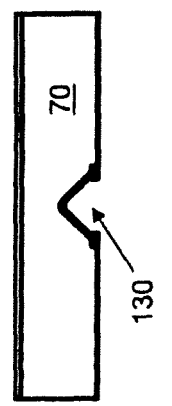
FIG. 11C is an end view of a portion of the reflector of FIG. 10 without a directional member.

In more detail and with reference to FIG. 11A, FIG. 11B, FIG. 11C, and FIG. 11D further details of the embodiment of a portion of the lighting apparatus of FIG. 10. As shown in the side view of FIG. 11B, the directional member 122 extends through one or more of the reflective elements 70. In one embodiment, a portion of the reflective elements 70 is removed to create a cut-out 130 having shape that compliments that of a portion of the directional member 122. In one embodiment, the directional member 122 has a v-shaped cross section and the cut-out 130 is shaped to receive the directional member 122, as shown in FIG. 11C. In other embodiments, the directional member 122 has another shape. For example, the directional member can be a single piece of reflective material positioned at a specific angle relative to the base member 110. Said another, the reflective member can be, in some embodiments, one side of the v-shaped directional member 122. In other embodiments, the reflective member 122 has a u-shaped, a parabolic, or other shape cross section.

In one embodiment, the cut-out 130 supports the directional member 122 when inserted through the cut-out 130. The depth, as measured from the first surface 114 of the base member 110 controls the amount of material that is present to support the directional member 122. In another embodiment, the directional member 122 is attached to opposing ends of the base member 110. As seen from the top view of FIG. 11A, when lighting sources 52 are not disposed in the openings 118, a portion of the reflective member 122 can be seen through the opening 118. When the lighting source 52 is present, the light radiating from the lighting source 52 is directed, at least in part, towards the reflectors 70 and/or reflective members 122, which, in turn, reflect the radiated light according to a desired pattern.

As shown, the cross-section of the reflective elements 70 is v-shaped. Further, as shown in FIG. 11B the v-shaped cross-section for the reflector can also be used in an embodiment that, in some instances, lacks the directional member 122. Other shaped cross-sections can be used as well. For example, a substantially u-shaped, parabolic, or other cross section can be employed. Also, as shown in FIG. 11D the base member 110 and reflective members 70 can be formed integrally from a single contiguous piece of material (e.g., sheet metal).

Figure 12B:
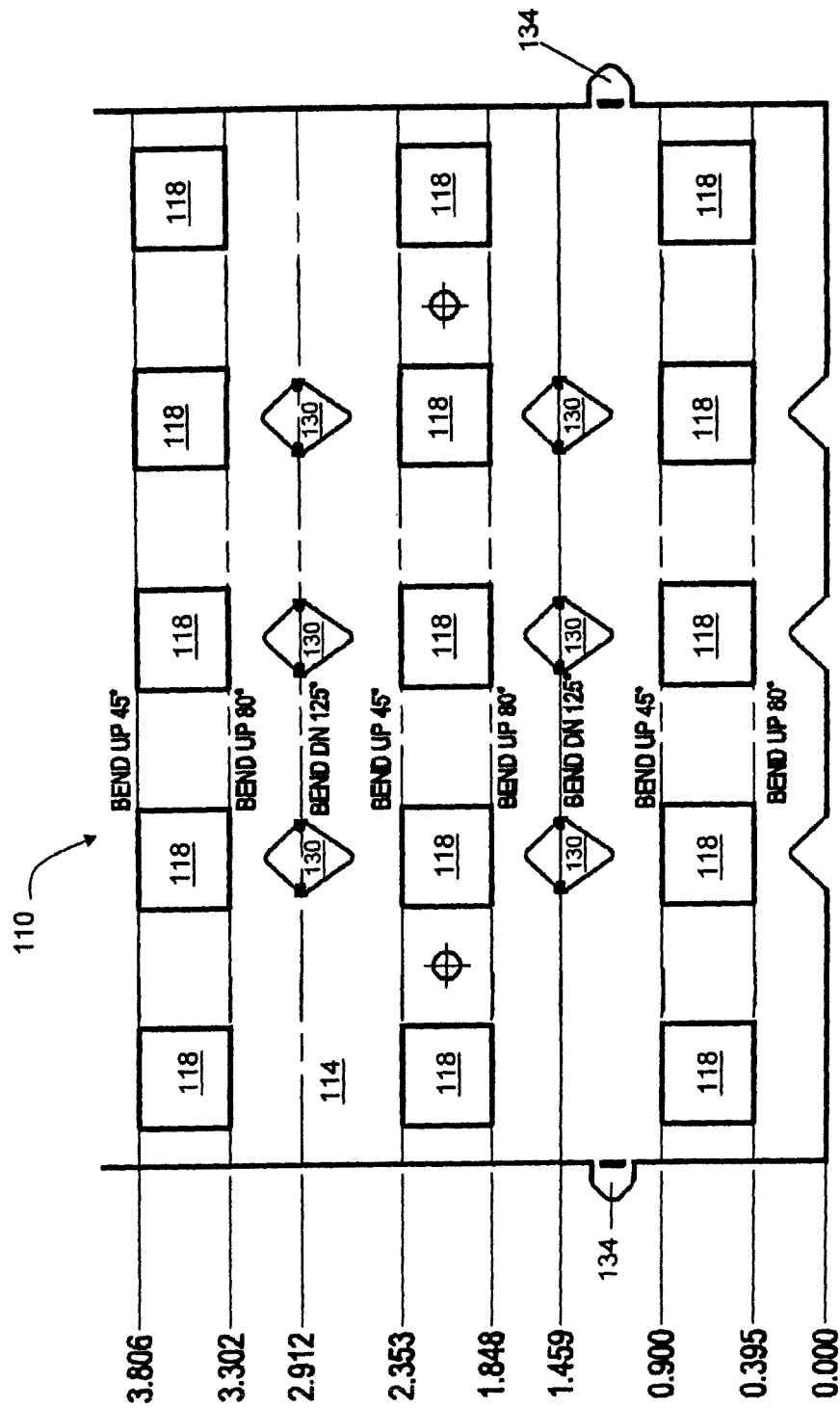
FIG. 12B is a top view of a portion of the base member prior to bending.

With reference to FIG. 12A and FIG. 12B, an exemplary embodiment of the base member 110 that is formed to create reflective elements 70. The specific lengths and angles of each portion of the base member 110 are provided as mere examples and are not intended to be limiting the disclosure to a single embodiment. As shown in FIG. 12B, the base member 110 has a first surface 114 that is reflective in nature (e.g., polished sheet metal). Also include in the base member are the openings 118 and the cut-outs 130. Also, shown are tabs 134 that can be used to secure the base member 110 to the side member 126 using a corresponding slot 138 (see FIG. 13). As shown, the base member 110 is bent at specified angles and specified locations to create a portion of the lighting apparatus 10.

With reference to FIG. 13, a top view of side member 126 is shown. In one embodiment, the side member has one or more slots 138 configured to receive a corresponding tab 134 of the base member 110. The tab 134 can be inserted and bent to attach the side member 126 to the base member 110. The dimensions shown in FIG. 13 are only exemplary and not intended to limit the disclosure. As stated above, at least one of the faces of the side member 126 is reflective.

While the disclosure makes reference to the details of preferred embodiments of the disclosure, it is to be understood that the disclosure is intended in an illustrative rather than in a limiting sense, as it is contemplated that modifications will readily occur to those skilled in the art, within the spirit of the disclosure and the scope of the appended claims.

We claim:

1. A luminaire comprising:
    a plurality of lighting sources;
    a coverplate comprising:
        a base defining a plurality of openings, one or more of the plurality of openings receiving a lighting source;
        a plurality of reflectors extending from the base, at least one of the plurality of reflectors extending adjacent at least one of the plurality of openings, at least one of the plurality of reflectors having a first side and a second side defining a distal edge of the reflector; and
        at least one side portion extending generally outward from the base and tapered outwardly.

2. The luminaire of claim 1, wherein a plurality of the lighting sources are arranged in a first row oriented in a first direction, a plurality of the lighting sources are arranged in a second row oriented in the first direction, and at least one of the plurality of reflectors extends from the base member between the first row of lighting sources and the second row of lighting sources and is oriented in the first direction.

3. The luminaire of claim 1, wherein the at least one side portion comprises two sides portions.

4. The luminaire of claim 1, wherein the coverplate further comprises end portions extending generally outward from the base.

5. The luminaire of claim 1, wherein at least one of the plurality of reflectors extends from the base member at an angle δ of about 0° to about −20° from perpendicular to the base.

6. The luminaire of claim 1, wherein the luminaire is a roadway luminaire.

7. The luminaire of claim 1, wherein the first side and second side of at least one of the reflectors form a substantially V-shaped cross-section.

8. The luminaire of claim 1, at least one of the plurality of lighting sources is an LED.

9. The luminaire of claim 8, an optic associated with the LED.

10. A luminaire comprising:
    a housing defining a cavity;
    a plurality of lighting sources;
    a coverplate comprising:
        a base defining a plurality of openings, one or more of the plurality of openings receiving a lighting source;
        a plurality of reflectors extending from the base, at least one of the plurality of reflectors extending adjacent at least one of the plurality of openings, at least one of the plurality of reflectors having a first side and a second side defining a distal edge of the reflector; and
        at least one side portion extending generally outward from the base and tapered outwardly toward the housing.

11. The luminaire of claim 10, wherein a plurality of the lighting sources are arranged in a first row oriented in a first direction, a plurality of the lighting sources are arranged in a second row oriented in the first direction, and at least one of the plurality of reflectors extends from the base member between the first row of lighting sources and the second row of lighting sources and is oriented in the first direction.

12. The luminaire of claim 10, wherein the at least one side portion comprises two sides portions.

13. The luminaire of claim 10, wherein the coverplate further comprises end portions extending generally outward from the base and tapered outwardly toward the housing.

14. The luminaire of claim 10, wherein at least one of the plurality of reflectors extends from the base member at an angle δ of about 0° to about −20° from perpendicular to the base.

15. The luminaire of claim 10, wherein the luminaire is a roadway luminaire.

16. The luminaire of claim 10, wherein the first side and second side of at least one of the reflectors form a substantially V-shaped cross-section.

17. The luminaire of claim 10, at least one of the plurality of lighting sources is an LED.

18. The luminaire of claim 17, an optic associated with the LED.

19. A luminaire comprising:
    a housing having sidewalls, each defining a distal edge, and the sidewalls collectively defining a cavity;
    a plurality of lighting sources;
    a coverplate comprising:
        a base defining a plurality of openings, one or more of the plurality of openings receiving a lighting source;
        a plurality of reflectors extending from the base, at least one of the plurality of reflectors extending adjacent at least one of the plurality of openings, at least one of the plurality of reflectors having a first side and a second side defining a distal edge of the reflector; and
        at least one side portion extending generally outward from the base and tapered outwardly toward the distal edge of an associated housing sidewall.

20. The luminaire of claim 19, wherein a plurality of the lighting sources are arranged in a first row oriented in a first direction, a plurality of the lighting sources are arranged in a second row oriented in the first direction, and at least one of the plurality of reflectors extends from the base member between the first row of lighting sources and the second row of lighting sources and is oriented in the first direction.

21. The luminaire of claim 19, wherein the at least one side portion comprises two sides portions.

22. The luminaire of claim 19, wherein the coverplate further comprises end portions extending generally outward from the base and tapered outwardly toward the distal edge of associated housing sidewalls.

23. The luminaire of claim 19, wherein at least one of the plurality of reflectors extends from the base member at an angle δ of about 0° to about −20° from perpendicular to the base.

24. The luminaire of claim 19, wherein the luminaire is a roadway luminaire.

25. The luminaire of claim 19, wherein the first side and second side of at least one of the reflectors form a substantially V-shaped cross-section.

26. The luminaire of claim 19, at least one of the plurality of lighting sources is an LED.

27. The luminaire of claim 26, an optic associated with the LED.

28. A luminaire comprising:
- a plurality of lighting sources arranged in a substantially matrix-like pattern comprising a first row of lighting sources, a second row of lighting sources and a third row of lighting sources;
- a coverplate of sheet material comprising
  - a substantially planar base defining a plurality of openings comprising a first row of openings, a second row of openings and a third row of openings, one or more of the first row of lighting sources disposed in one or more of the first row of openings, one or more of the second row of lighting sources disposed in one or more of the second row of openings, one or more of the third row of lighting sources disposed in one or more of the third row of openings; and
  - a reflector extending integrally from the coverplate between the first row of openings and the second row of openings, the reflector having a reflective surface facing an adjacent one of the second row of openings and oriented at an angle δ of about 0° to about −20° from perpendicular to the substantially planar base.

29. The luminaire of claim 28, the reflector comprising an elongated reflector extending the entire length of the first row of openings.

30. The luminaire of claim 28, the reflector comprising an elongated reflector extending the entire length of the first row of lighting sources.

31. The luminaire of claim 28, the coverplate further comprising at least one side portion extending generally outward from the base.

32. The luminaire of claim 28, wherein the coverplate further comprises end portions extending generally outward from the base.

33. The luminaire of claim 28, the coverplate further comprising a second reflector extending integrally from the coverplate between the second row of openings and the third row of openings, the second reflector having a reflective surface facing an adjacent one of the third row of openings and oriented at an angle δ of about 0° to about −20° from perpendicular to the substantially planar base.

34. The luminaire of claim 28, wherein the luminaire is a roadway luminaire.

35. The luminaire of claim 28, wherein the reflector comprises a first side and a second side forming a substantially V-shaped cross-section.

36. The luminaire of claim 28, at least one of the plurality of lighting sources is an LED.

37. The luminaire of claim 36, an optic associated with the LED.

* * * * *